(12) United States Patent
Donaldson et al.

(10) Patent No.: US 8,782,547 B2
(45) Date of Patent: Jul. 15, 2014

(54) CONFIGURABLE BUILDING CONTROL SYSTEM DISPLAY

(75) Inventors: Stuart G. Donaldson, Bothell, WA (US); Patrick S. Brisbine, Sammamish, WA (US); Cuong C. Huynh, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 921 days.

(21) Appl. No.: 11/841,281

(22) Filed: Aug. 20, 2007

(65) Prior Publication Data

US 2009/0055765 A1    Feb. 26, 2009

(51) Int. Cl.
*G06F 3/048* (2013.01)

(52) U.S. Cl.
USPC ............................................. 715/771

(58) Field of Classification Search
CPC .................................................... G05B 19/042
USPC ......................................................... 715/771
See application file for complete search history.

(56) References Cited

U.S. PATENT DOCUMENTS

| | | | |
|---|---|---|---|
| 6,028,998 A | 2/2000 | Gloudeman et al. | |
| 6,067,477 A * | 5/2000 | Wewalaarachchi et al. | 700/83 |
| 6,141,595 A | 10/2000 | Gloudeman et al. | |
| 6,154,128 A * | 11/2000 | Wookey et al. | 340/506 |
| 6,400,103 B1 | 6/2002 | Adamson | |
| 6,405,103 B1 * | 6/2002 | Ryan et al. | 700/275 |
| 6,433,687 B1 | 8/2002 | Yamaashi et al. | |
| 6,487,457 B1 * | 11/2002 | Hull et al. | 700/17 |
| 6,571,140 B1 * | 5/2003 | Wewalaarachchi et al. | 700/83 |
| 6,609,127 B1 | 8/2003 | Lee et al. | |
| 6,615,175 B1 | 9/2003 | Gazdzinski | |
| 6,721,898 B1 | 4/2004 | Hasha | |
| 6,792,337 B2 * | 9/2004 | Blackett et al. | 700/295 |
| 6,804,709 B2 | 10/2004 | Manjure et al. | |
| 6,850,978 B2 | 2/2005 | Springmeyer et al. | |
| 6,934,696 B1 * | 8/2005 | Williams et al. | 706/47 |
| 6,970,925 B1 | 11/2005 | Springmeyer et al. | |
| 6,988,071 B1 | 1/2006 | Gazdzinski | |
| 6,993,771 B1 | 1/2006 | Hasha et al. | |
| 7,089,530 B1 | 8/2006 | Dardinski et al. | |
| 7,110,919 B2 * | 9/2006 | Brindac et al. | 702/188 |
| 7,159,147 B2 | 1/2007 | Hasha | |
| 7,349,761 B1 * | 3/2008 | Cruse | 700/276 |
| 7,464,339 B2 * | 12/2008 | Keenan et al. | 715/762 |
| 7,761,563 B2 * | 7/2010 | Shike et al. | 709/224 |
| 2001/0032268 A1 * | 10/2001 | Brown et al. | 709/230 |
| 2002/0016639 A1 * | 2/2002 | Smith et al. | 700/9 |

(Continued)

OTHER PUBLICATIONS

Suzuki et al. Teleoperation of Multiple Robots Through the Internet—Robot and Human Communication, 1996., 5th IEEE International Workshop pp. 84-88.*

(Continued)

*Primary Examiner* — William Bashore
*Assistant Examiner* — Henry Orr
(74) *Attorney, Agent, or Firm* — Seager, Tufte, Wickhem LLC (57) ABSTRACT

A system and method for displaying information on a display of a building control system. In one illustrative embodiment, a display controller is provided that includes a configuration mechanism for configuring the information that is to be displayed on the display. The configuration mechanism may include one or more user definable object description reference strings that include tokens that identify which device and/or object information to display on the display.

17 Claims, 4 Drawing Sheets

(56) References Cited

U.S. PATENT DOCUMENTS

| | | |
|---|---|---|
| 2002/0198990 A1 | 12/2002 | Bradfield et al. |
| 2003/0040842 A1 | 2/2003 | Poth |
| 2003/0048304 A1* | 3/2003 | Lontka et al. ............ 345/771 |
| 2006/0010388 A1 | 1/2006 | Imhof et al. |
| 2006/0048846 A1* | 3/2006 | Roenneburg et al. ...... 141/130 |
| 2006/0064468 A1* | 3/2006 | Brown et al. ............. 709/217 |
| 2006/0102006 A1 | 5/2006 | Powell |
| 2006/0224959 A1* | 10/2006 | McGuire et al. ........... 715/700 |
| 2006/0247801 A1* | 11/2006 | Brown et al. .............. 700/56 |
| 2007/0208438 A1* | 9/2007 | El-Mankabady et al. ..... 700/83 |
| 2008/0275576 A1* | 11/2008 | Brown et al. .............. 700/56 |
| 2010/0031177 A1* | 2/2010 | Reed et al. ............... 715/771 |

OTHER PUBLICATIONS

"Device Implementation Guidelines," BACnet Testing Laboratories, V 0.17, 28 pages, Apr. 4, 2007.

"Sample BACnet Messages via ARCNET and Point-to-Point," 40 pages, Oct. 27, 1998.

Ritter et al., "Access Control in BACnet," BACnet Today, A Supplement to ASHRAE Journal, pp. B26-B32, Nov. 2006.

* cited by examiner

CONFIGURABLE BUILDING CONTROL SYSTEM DISPLAY

FIELD

The present invention relates generally to building control systems, and more particularly, to systems and methods of configuring and displaying information in building control systems.

BACKGROUND

Many modern building control systems, or building automation systems, include a programmed, computerized, "intelligent" network of building controllers that monitor and control the mechanical, lighting and/or other systems of a building. The use of building control systems can, for example, reduce energy use, reduce maintenance costs, and/or increase the comfort of a building. In many cases, the building controllers used in such building control systems are application specific controllers, or embedded building controllers, that are adapted to control a particular function and/or region of a building. Such building controllers come in a wide range of sizes and capabilities that are often application specific for controlling a particular type of device or system within a building.

In some cases, the "intelligent" network may operate using a building automation and control network (BACnet) or other protocol. BACnet is a flexible, object-oriented, open protocol communication standard that permits interoperability between different manufacturer's building automation control products. In some cases, information in a BACnet or other system may be expressed in terms of objects. An object might represent information about a particular building control device, a physical input or output, a logical grouping of objects that perform some function, or the like. Each object may include one or more identifiers that may be used for identification purposes within the BACnet system. The objects may be monitored and/or controlled via one or more object properties such as, for example, an object identifier, an object name, an object type, an object sensor reading, as well as other properties, depending on the application.

Many building automation systems have a personal computer or other general purpose computer or workstation connected to the building control system network. Typically, building control software is run on the personal computer or other workstation to help control and/or monitor the operation of the overall building control system. The building control software can be use to, for example, help setup, configure, program and/or monitor the various objects on the network, as well as monitor and control the operation of the overall building control system. The building control software typically includes a display for displaying information to a user, installer, technician or other person.

In many cases, the information displayed to the user, installer, technician, or other person may be displayed according to one of many different naming systems, which, in some cases, can be problematic. In one example, when integrating systems, such as, for example, legacy systems, the building control system network may have multiple naming conventions. For example, some manufactures may use a property description for a particular object or object property, whereas other manufactures may use the object name or an object instance when referring to a device or object on the display. A user, installer, technician, or other person may be more familiar with a specific naming convention than other naming conventions. This inconsistency can increase the time and cost of maintenance, installation, repairs, and/or operation of the building control system.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention generally relates to building control systems, and more particularly, to systems and methods for configuring and displaying information in building control systems. In one illustrative embodiment, a display controller is provided that includes a configuration mechanism for configuring the information that is to be displayed on the display. The configuration mechanism may include one or more user definable object description reference strings that include tokens that identify which device and/or object information to display on the display.

BRIEF DESCRIPTION

The invention may be more completely understood in consideration of the following detailed description of various illustrative embodiments of the invention in connection with the accompanying drawings, in which.

DETAILED DESCRIPTION

The following description should be read with reference to the drawings wherein like reference numerals indicate like elements throughout the several views. The detailed description and drawings show several embodiments which are meant to be illustrative of the claimed invention.

The present invention including the generation and/or configuration of object and/or point information will be described with reference to a display subsystem merely for illustrative purposes. However, this is not meant to be limiting in any manner and it is to be understood that the present invention may be incorporated into any suitable system or subsystem where it may be desirable to configure the data, such as, for example, data logging, report distributions subsystems, and alarm distributions subsystems.

Figure 1:
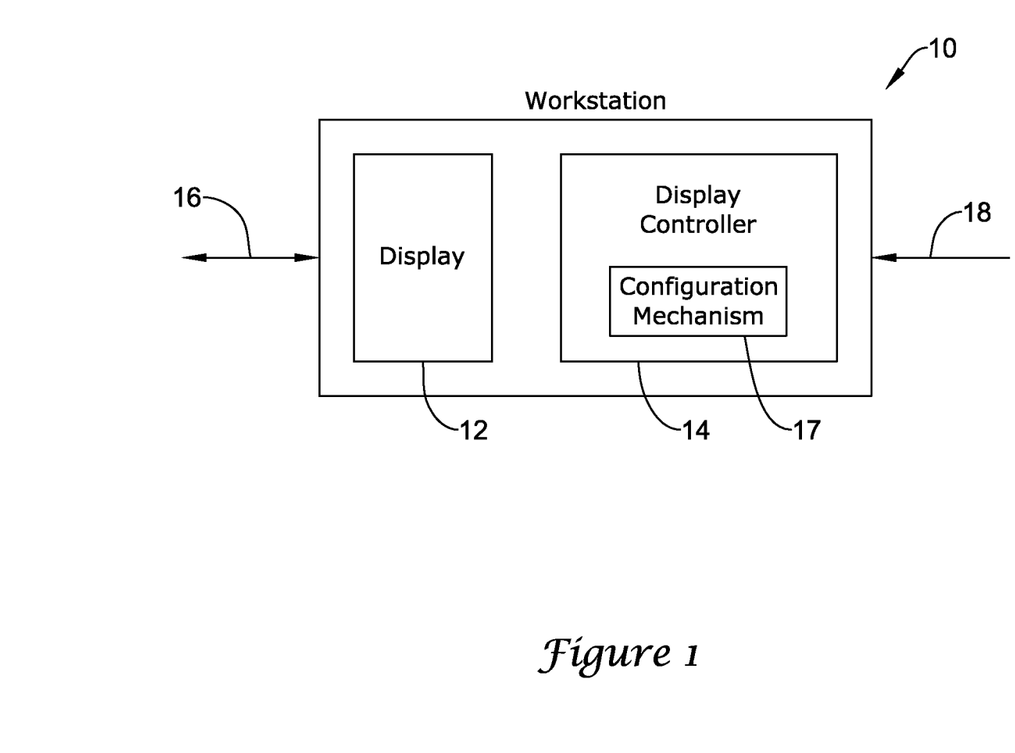
FIG. 1 is a block diagram of an illustrative workstation including a display and a display controller.
Figure 2:
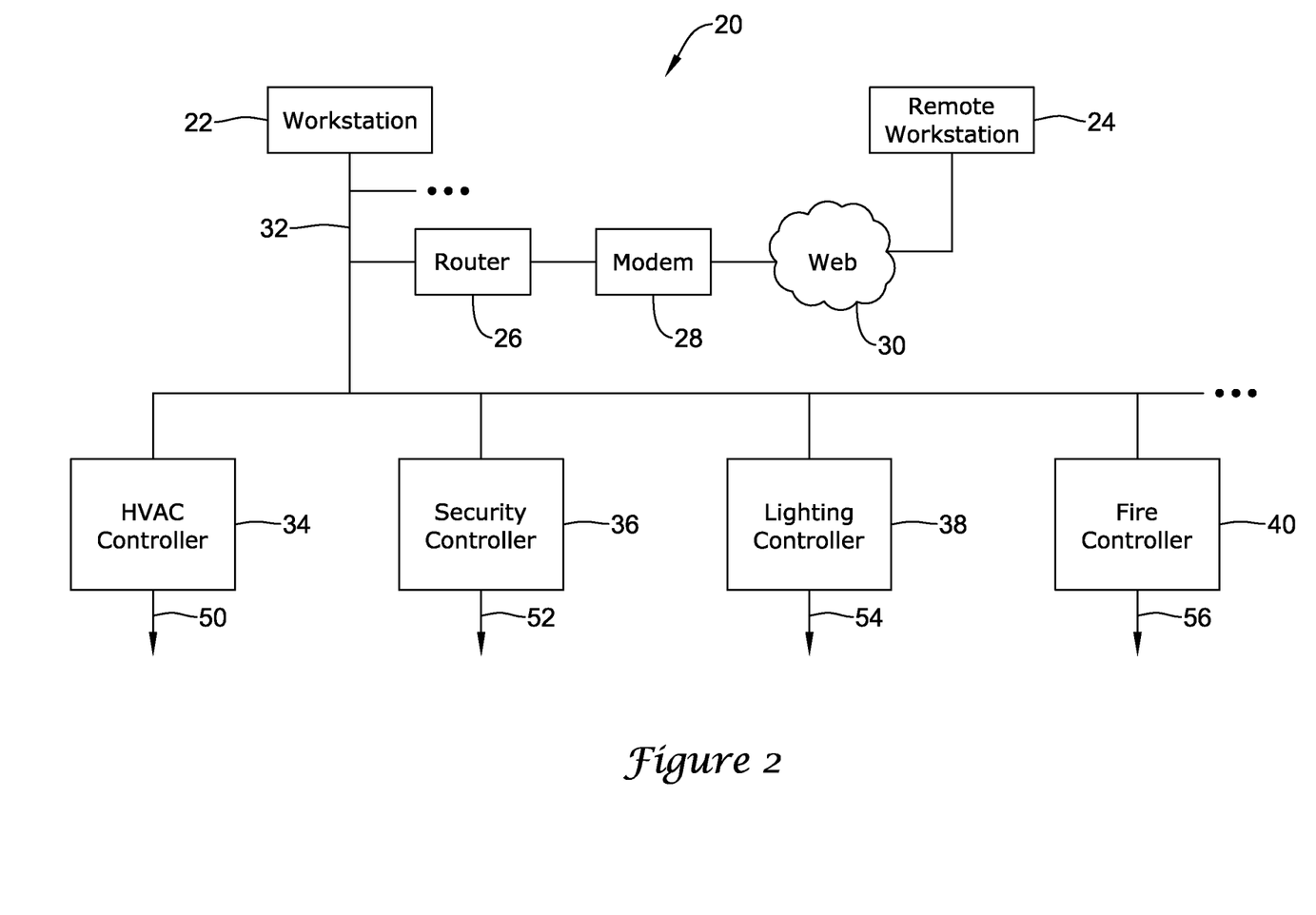
FIG. 2 is a schematic diagram of an illustrative building control system network.

FIG. 1 is a block diagram of an illustrative workstation 10 including a display 12 and a display controller 14. The illustrative workstation 10 may be adapted to be connected to a network, such as a building control system network as shown in FIG. 2, via a network interface 16. Workstation 10 may also be adapted to receive one or more inputs from a user via user interface 18. While a workstation 10 is shown in FIG. 1, it is contemplated that the any general or special purpose computer that includes a display and display controller could be used, as desired. In some cases, the workstation 10 and/or display controller may be provided in or as part of a personal computer or PDA, if desired.

In the illustrative embodiment, the workstation 10 may include a building control software package that can be used to help control, monitor, and/or display the operation of the overall building control system. The building control software can, for example, help setup, configure, program and/or monitor the various building control devices on the network, as well as monitor and control the operation of the overall building control system. The illustrative building control software communicates with the various devices that are connected to the building control network, sometimes using a BACnet or other suitable protocol.

In one example, and as will be discussed further below, the building automation devices can include one or more pieces of HVAC, lighting, security, fire, and/or other equipment connected to the workstation 10 via interface 16. Some pieces of equipment may include building controllers, such as, heating, ventilation, and air condition (HVAC) controllers, security system controllers, lighting system controllers, fire system controllers, power management controllers, and/or any other suitable types of building controllers, as desired. Each example controller may control a number of building component devices. Example HVAC building components that may be controlled by the HVAC controllers may include, but are not limited to, dampers, valves, sensors, AC units, heating units (i.e. boilers, furnaces, etc.), and ventilators. Example security building components may include, but are not limited to, detectors (i.e. motion, fire, smoke, glass, etc.), alarms, cameras, and security lights. Example lighting building components may include, but are not limited to, timers, occupancy sensors, and light fixtures. Example fire building components may include, but are not limited to, detectors (i.e. smoke, heat, air quality, etc.), alarms, and sprinklers.

In the illustrative embodiment, workstation 10 may include a display 12 and a display controller 14. Display 12 may be able to display information regarding information or data pertaining to the building control system and/or devices and/or components within the building control system. For example, display 12 may be able to display object information and/or point information, if desired. Point information may correspond to parameter values or data such as, for example, temperatures, pressures, status, etc. of devices (or objects) within the building control system. In some cases, display 12 may display the object and/or point information to a user, programmer, technician, and/or installer for viewing. The user may use the information for configuring the building control system, controlling the building control systems, and/or checking the status of the system. In some cases, display 12 may include a graphical user interface (GUI).

In the illustrative embodiment, display controller 14 may, for example, specify what information is displayed on the display 12 and how the information is displayed. In one illustrative embodiment, display controller 14 may include a configuration mechanism 17 to configure and/or customize the object or point information to be displayed on display 12, as desired. In some cases, the configuration mechanism 17 may be software implemented in the display controller 14.

In one illustrative embodiment, the configuration mechanism 17 may include or reference one or more Object Description Reference Strings (ODRS). In one example, an ODRS may include one or more tokens, where each token corresponding to a subset of information that is related to one or more of the devices or objects within the building control system. In some cases, the one or more tokens may be configured in a template string, a method, an algorithm, or in any other suitable form, as desired. In some cases, the display controller 14 may be configured to parse the ODRS to determine what corresponding object and/or point information to display on display 12 for each or selected devices. In some cases, an ODRS may provide display controller 14 with real world object and/or point information about the device(s), which, in some cases, may provide more meaningful information to a viewer and help the user better understand the data and manage the system more efficiently.

In some cases, the ODRS may include tokens that provide building automation and control network (BACnet) protocol information, such as, device and/or object properties. In this example, example tokens may designate device, object, or point information, such as, for example, a device name (DN), a device instance (DI), a device description (DD), a device location (DL), an object name (ON), an object type (OT), an object identifier (01), an object description (OD), as well as other possible tokens, as desired. In some cases, tokens may include customizable tokens including other device, object or point information and/or descriptions, as desired.

In the illustrative embodiment, DI may be the device instance identifier, which, in some cases, may be an integer or other value. DD may be a user-defined description of the device, which, in some building control systems, may be an optional field. In one example, DD for a thermostat in the main lobby may be "Main Lobby", or for an office, DD may be "John Doe's Office". Any other suitable device description may be used for DD, as desired. DL may be a user-defined location of the device. For example, DL may be "Joe's Office". DN may be the name of the device. In some systems, this may be a generated value, while in other systems, it may be a user-definable field.

OI may be an object identifier of an object, which, in some cases, may be an integer or other value. OD may be a user-defined description of an object, which, in some cases, may be an optional field. In one example, OD may be "Space Temp" or any other suitable description, as desired. ON may be the name of an object, which in some systems may be a generated value, or in other systems, may be a user-definable field. OT may be an enumerated value from the BACnet specification, such as, for example, analog input (AI), analog output (AO), analog value (AV), binary input (BI), binary output (BO), binary value (BV), multi-state input (MI), multi-state output (MO), calendar, event-enrollment, file, notification-class, group, loop, program, schedule, and command.

In some cases, the ODRS may include one or more definable token operators. For example, " " may be used to indicate to the display controller 14 what property to display, brackets "{ }" may be used to indicate a token, "-" may be used for conditional evaluation, as will be discussed in further detail below, or any other suitable operators, as desired.

In one example, an ODRS for a particular device may include a combination of tokens such as "{DD}/{OD}". In this instance, the display controller 14 may parse the information and display the "device description/object description" for the device. For an example device description of "Main Lobby" and an example object or point description of "Space Temp", the example ODRS may cause the device controller 14 to display "Main Lobby/Space Temp" on the display.

In another example, the ODRS for a given device may be "Dev {DI}, {OT} {OI}". In this example, the display controller 14 may display "Dev 100, AV 101", for an example device having a device instance value of "100" and an object type of "AV 101". These foregoing example ODRS definitions are merely illustrative, and it is contemplated that any suitable ODRS definition having any suitable form may be used, as desired. It is contemplated that the illustrative tokens may be combined by the user in any suitable manner, as desired, resulting in a flexible and customizable way for displaying information on the display 12.

In some cases, the configuration mechanism 17, which may include one or more ODRS definitions, may provide for conditional evaluation. The conditional evaluation may specify, for example, which fields to display if one or more of the fields are not present for a device. For example, in one case, the ODRS for a given device may be defined as "{OD-ON-OT:OI}". In this example, the display controller 14 may parse the ODRS and determine that it should display the object description, but if the object description is not available, display the object name, and if the object name is also not available, display the object type, followed by the object identifier.

In one illustrative embodiment, it is contemplated that there may not always be an ODRS specified for a given device or object. If this is the case, a system default ODRS may be provided or used, if desired. When so provided, the display controller 14 may search the configuration mechanism 17 to determine if a corresponding ODRS is provided for a particular device, and if there is, use the provided ODRS. However, if there is no ODRS provided for the particular device, then the display controller 14 may use a system default ODRS.

A system default ODRS may be "{DD},{OD}", "Dev {DI}, {OT}, {OI}", a conditional ODRS, or any other ODRS, as desired. In one example, a system default ODRS may be defined as "{DD-DN-DL-Dev DI}, {OD-ON-OT:OI}". In this example, when selecting the device information to display, the display controller 14 may use the device description, if the device description value is null or empty for a particular device, use the device name, if the device name value is null or empty for a particular device, use the device location, if the device location value is null or empty for a particular device; use the device identifier. When displaying the object or point information, the display controller 14 may be use the object description, if the object description value is null or empty for a particular object, use the object name, if the object name value is null or empty for a particular object; use the object type plus the object identifier.

In some cases, the configuration mechanism 17 may be configured by the manufacturer, vendor, and/or installer, and in some cases, may be configured to limit the control that the ultimate user may have over the ODRS configuration. However, it is contemplated that the configuration mechanism 17 may be configured such that the user has some or unlimited control over the configuration mechanism 17, if desired. It is also contemplated that the configuration mechanism 17 may be specified or configured on a per device basis. In other cases, the configuration mechanism 17 may be configured on a multiple device or a global basis, as desired.

The display controller 14 may be configured to temporarily disable the configuration mechanism 17 and/or the ODRS. For example, and in some cases, this may be performed by a user during a session. The temporary disablement may allow the user to see the underlying data instead of the ODRS provided data. In some cases, this may be determined, in part, by the user preferences.

It is also contemplated that the configuration mechanism 17 may be configured on a per session basis. For example, when a first user opens a session in the workstation 10, the user may specify an ODRS configuration for the configuration mechanism 17. When a second user opens a session in the workstation 10, the second user may specify a different ODRS configuration. This may allow the various users to select a particular ODRS configuration according to their preferences. In some cases, the workstation 10 may receive an imported ODRS configuration via network interface 18 or other interface, as desired.

It is contemplated that the configuration mechanism 17 may be configured by a user in any suitable way. For example, the configuration mechanism 17 may be configured using a windows based application program, a JAVA application program, or in any other suitable way. In one example, a GUI having a dialog box or the like may be provided displaying for each device within the building control system a checkbox for each of DD, DI, DN, DL, OD, OI, OT, ON. The selected checkboxes may represent the information that is to be displayed for that particular device and/or object on the display 12.

FIG. 2 is a schematic diagram of an illustrative building control system network. In the illustrative embodiment, the building control system includes a network 20, and workstations 24 and 22 are coupled to the network 20. At least one of the workstations 24 or 22 includes a configuration mechanism 17, as described above with respect to FIG. 1. The illustrative building control system network 20 may have one or more building controller 34, 36, 38, and 40, which are connected to one or more building control devices (not shown), each of which may have one or more objects associated therewith.

In the illustrative embodiment, the one or more workstation 22 and 24 may be general purpose computers or workstations, PDAs, or any other suitable device, as desired. In some cases, a remote workstation 24 may be connected to the network 20 via a modem and/or router. This may allow the remote workstation 24 to access the network and communicate with the building control controllers 34, 36, 38, and 40, and other building devices. In some cases, router 26 may be used to connect one or more networks together. For example, the networks may be Local Area Networks (LANs) through which the BACnet devices may communicate. The LANs may be point-to-point (PTP), master slave/token passing (MS/TP), ARCNET, Ethernet, LONtalk, or have any other suitable configuration, as desired.

In the illustrative embodiment, workstations 22 and 24 may be similar to workstation 10 discussed above with respect to FIG. 1. That is, in an illustrative embodiment, workstations 22 and/or 24 may include a display and a display controller having a configuration mechanism 17. The configuration mechanism 17 may determine how the device, object and/or point information is displayed on the display 14 of the workstation 22 or 24.

In the illustrative embodiment, the one or more building controllers 34, 36, 38, and 40 may be embedded building controllers that are adapted to control one or more building devices or components (not shown) via one or more I/O interfaces 50, 52, 54 and 56. It is contemplated that the building components may monitor and/or control one or more physical properties of the building, such as temperature, humidity, ventilation, building access, lighting, fire detection and/or fire suppression, etc.

In an illustrative embodiment shown in FIG. 2, building controller 34 is shown as an HVAC controller, and may control HVAC functions, such as, for example, HVAC schedules, temperature setpoints, humidity setpoints, trend logs, timers, environment sensing, and/or other HVAC functions, as desired. Example HVAC building components that may be controlled by the HVAC controller may include, but are not limited to, dampers, valves, sensors, AC units, heating units (i.e. boilers, furnaces, etc.), and ventilators.

Building controller 36 is shown as a security controller, and may control security functions, such as, for example, motion detection, contacting police, operating alarms, monitoring and controlling cameras, operating security lights, and/or other security functions, as desired. Example security building components may include, but are not limited to, detectors (i.e. motion, fire, smoke, glass, etc.), alarms, cameras, and security lights.

Building controller 38 is shown as a lighting controller, and may control lighting functions, such as, for example, room lighting, lighting schedules, light timers, occupancy detectors, and/or other lighting functions, as desired. Example lighting building components may include, but are not limited to, timers, occupancy sensors, and light fixtures.

Building controller 40 is shown as a fire controller, and may control fire functions, such as, for example, smoke detection, heat sensing, air quality sensing, notifying fire departments, sprinkler operation, activating alarms, and/or other fire functions, as desired. Example fire building components may include, but are not limited to, detectors (i.e. smoke, heat, air quality, etc.), alarms, and sprinklers.

In some cases, each of the foregoing building controllers, building controller functions, and building controller components, such as, for example, the sensors, timers, alarms, detectors, valves, and so forth, may define one or more objects of the building control system network. Each object may also include object information, which may include object properties.

In the illustrative embodiment, the building controllers 34, 36, 38, and 40 may be connected or in communication via a network interface 32. The workstation 22 and/or the remote workstation 24 may also be in communication with the building controllers 34, 36, 38, and 40 via the network interface 32. In some cases, the network interface 32 may be an Ethernet or other network, and/or may include the building's power lines as the interface. More generally, it is contemplated that the network 32 may be any suitable network that allows the building controllers 34, 36, 38 and 40, and/or the workstations 22 and 24 to communicate.

Figure 3:
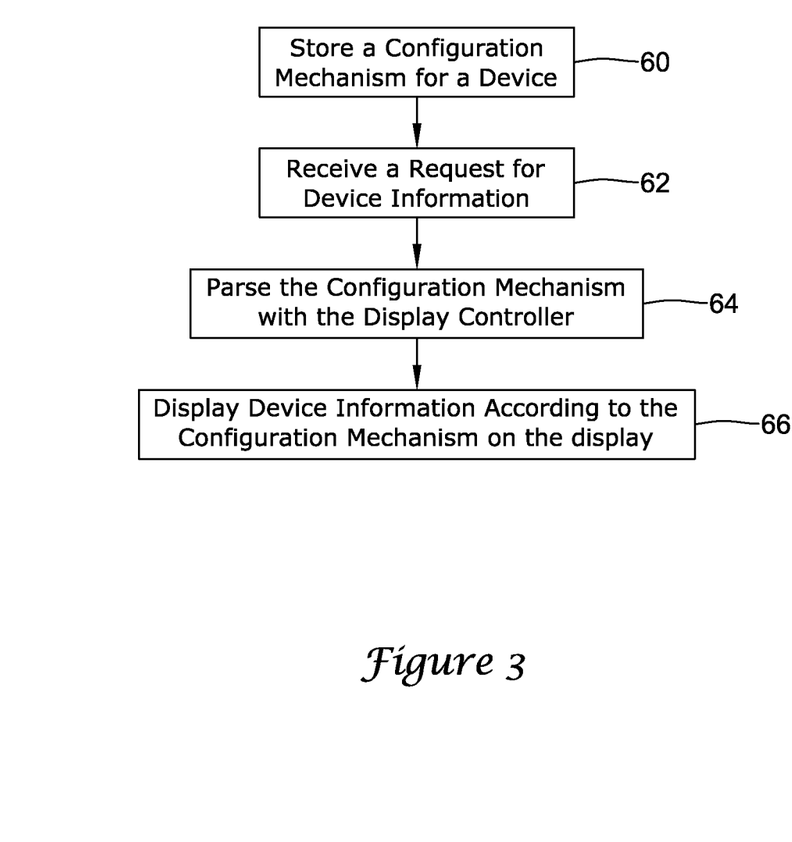
FIG. 3 is a flow diagram of an illustrative method of displaying information in a building control system that has a display configuration mechanism.

FIG. 3 is a flow diagram of an illustrative method of displaying information in a building control system that has a display configuration mechanism. Initiation of the software, as shown in block 60, may include a user, installer, technician, or any other person, storing a configuration mechanism in, for example, a workstation or other network location, as desired. In some cases, the configuration mechanism may be stored as a control algorithm in a software program for configuring device, object and/or point information to be displayed. In some cases, the configuration mechanism may be stored in RAM, ROM, EEPROM, Flash memory, or any other suitable memory, as desired.

In the operational phase, beginning in block 62, the workstation and/or display controller may receive a request for device, object and/or point information. In some cases, a user may enter the request via a user interface such as via a keyboard, a mouse, a touch screen, a voice command, or any other suitable method, as desired. In other cases, software on the workstation and/or display controller may automatically request the device, object and/or point information for display on the display.

Next, in block 64, the workstation and/or display controller may determine the configuration mechanism for the requested device, object and/or point information and may parse the configuration mechanism. In some cases, the display controller may parse tokens of the configuration mechanism, such as, when the configuration mechanism includes an ODRS. It is contemplated that the configuration mechanism may be implemented on a global basis, a group basis, or on a per device basis, as desired.

In block 66, the display controller may use the device, object and/or point information identified by the configuration mechanism, such as, for example, the tokens from the ODRS, to display the device, object and/or point information accordingly. In some cases, displaying the device, object and/or point information may include a conditional evaluation to determine which information or data is available, but this is not required in all embodiments. The method may then continue to run the operational phase of the program beginning with block 62, if desired.

Figure 4:
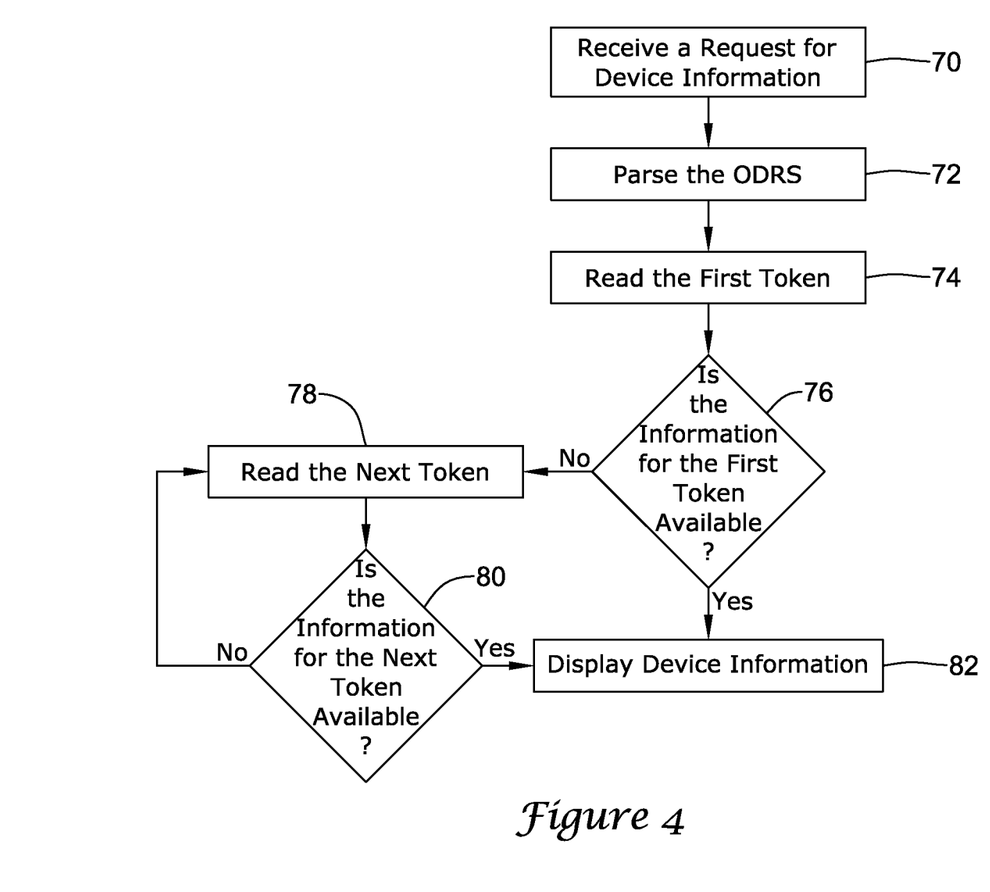
FIG. 4 is a logic diagram of another illustrative method of displaying information in a building control system that has a display configuration mechanism.

FIG. 4 is a logic diagram of another illustrative method of displaying information in a building control system that has a display configuration mechanism. In block 70, the workstation and/or display controller may receive a request for device information, such as, device, object and/or point information. In some cases, a user may enter the request via a user interface such as via a keyboard, a mouse, a touch screen, a voice command, or any other suitable method, as desired. In other cases, software on the workstation and/or display controller may automatically request the device, object and/or point information for display on the display.

In block 72, the display controller may parse, for example, one or more tokens of an ODRS and determine the device, object and/or point information to be displayed on the display. Next, in block 74, the display controller may read the first token. In block 76, the display controller may determine if the information corresponding to the first token is available. If the token information is available, then in block 82, the display controller may assemble and/or display the object and/or point information corresponding to the first token. However, if the information for the first token is not available, then, in block 78, the display controller may read the next token of the ODRS. In block 80, display controller may determine if the object and/or point information corresponding to the next token of the ODRS is available. If the object and/or point information is available, then, in block 82, the object and/or point information may be assembled and/or displayed. However, if the token information is not available, then, the control sequence can return to block 78 and the display controller may read a next token. The controller may continue this loop until token information is available to be displayed or there are no more tokens specified in the ODRS. In some cases, there may be two, three, four, five, six, or any other number of tokens provided for in the illustrative conditional evaluation of the ODRS, as desired.

For simplicity, the method of FIG. 4 and foregoing description has been described with reference to an ODRS having one or more tokens referencing object and/or point information. More generally, it is to be understood that the present invention may include an ODRS having a conditional expression, which may include tokens, programming language expressions, or any other suitable expressions that reference device, object, and/or point information, as desired. In the case of the programming language expression, an ODRS expression may include a concatenation of one or more ODRS sub-expressions. The ODRS sub-expressions may include a literal text, a computed text, or other text or values associated with device, object, and/or point information.

In one example, an ODRS programming language expression may include an <ODRS expression>:=concatention of one or more <ODRS sub-expression>, an <ODRS sub-expression>:={[<literal-text>][<computed-text>]}+, where <computed-text>:=syntax to be defined which may specify text associated with device, object, and/or point information including conditions such as selection among alternative available values. One example of an ODRS including two sub-expressions may be "{DD-DN-DL-Dev DI}, {OD-ON-OT:OI}".

The illustrative embodiments have been described above with reference to building control systems, however, this is merely illustrative and is not meant to be limiting in any manner. It is to be understood that the display configuration mechanism may be used in industrial control systems, software development systems, or any other control systems that display object references.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A display controller for a building control system, wherein the building control system includes one or more building control devices, and wherein at least selected building control devices have one or more corresponding objects, the display controller comprising:
 a display configured to display information related to one or more of the building control devices; and
 a display controller programmed to display the information related to the one or more building control devices on the display, wherein the display controller provides a user interface for allowing a user to interact with a configuration mechanism to define at least part of a user definable object description reference string (ODRS) definition, wherein the user definable object description reference string (ODRS) definition comprises a string that has at least one conditional expression that includes one or more logical operators and two or more tokens, wherein each of the two or more tokens reference one or more object properties of a selected object of the corresponding building control device, the display controller displaying an object property indicated by a first condition of the at least one conditional expression unless the object property indicated by the first condition of the at least one conditional expression is not available for a corresponding building control device,
 wherein the object description reference string (ODRS) is parsed by the display controller to determine the information to be displayed.

2. The building control system of claim 1 wherein the object description reference string (ODRS) definition includes one or more tokens corresponding to a subset of the one or more object properties of the selected object of the corresponding building control device.

3. The building control system of claim 2 wherein the display controller is configured to parse the string of two or more tokens and display the corresponding subsets of object properties on the display and to parse the string of two or more tokens and display corresponding point information.

4. The building control system of claim 2 wherein at least one of the tokens corresponds to a descriptive text string object property.

5. The building control system of claim 2 wherein at least one of the tokens corresponds to a device name object property.

6. The building control system of claim 2 wherein at least one of the tokens corresponds to an object name object property.

7. The building control system of claim 2 wherein at least one of the tokens corresponds to a device instance name object property.

8. The building control system network of claim 1 wherein the object description reference string (ODRS) definition is user configurable via the display controller.

9. The building control system network of claim 1 wherein the configuration mechanism is software implemented in the display controller.

10. A method of displaying information relative to two or more building control devices of a building control system, the method comprising:
 providing a user definable object description reference string (ODRS) definition for each of two or more building control devices of the building control system, wherein each object description reference string (ODRS) definition includes a string that has at least one conditional expression that includes one or more logical operators and two or more tokens, wherein one or more of the tokens identify one or more object properties of one or more objects for the corresponding building control device and one or more of the tokens identify point information associated with one or more objects, wherein the point information corresponds to parameter and/or data values;
 providing a user interface on a display for allowing a user to define at least part of one or more of the user definable object description reference string (ODRS) definitions;
 parsing each of the object description reference string (ODRS) definitions to identify the one or more tokens that correspond to each of the two or more building control devices;
 retrieving available object properties of the one or more objects that correspond to the identified ones of the two or more tokens from each of the corresponding building control devices; and
 displaying an object property indicated by a first condition of the at least one conditional expression unless the object property indicated by the first condition of the at least one conditional expression are not available for a corresponding building control device.

11. The method of claim 10 wherein the object description reference string (ODRS) definition for at least one of the two or more building control devices is user definable.

12. The method of claim 10 wherein at least one object description reference string (ODRS) definition corresponds to two or more building control devices.

13. The method of claim 10 wherein the object description reference string (ODRS) definitions are applied on a per user basis.

14. The method of claim 10 wherein one of the tokens identifies a descriptive text string object property for the corresponding building control device.

15. A method of displaying information relative to two or more building control devices of a building control system on a display, comprising:
 providing a display controller programmed to display information related to each of the building control devices of the building control system on the display, the display controller providing a user interface for allowing a user to interact with a configuration mechanism to define at least part of an object description reference string (ODRS) definition for one or more building control devices of the building control system, wherein at least one of the user definable object description reference string (ODRS) definitions includes a string that has at least one conditional expression that includes one or more logical operators and two or more tokens, the conditional expression indicating what information about the corresponding building control device is to be displayed by the display controller;

displaying the information indicated by a first condition of the at least one conditional expression unless the information indicated by the first condition of the at least one conditional expression is not present for a corresponding building control device; and when the information indicated by the first condition of the at least one conditional expression is not present, displaying the information indicated by a second condition of the at least one conditional expression unless the information indicated by the second condition of the at least one conditional expression is not present.

16. The method of claim 15 further comprising:

when the information indicated by the second condition of the at least one conditional expression is not present, displaying the information indicated by a third condition of the at least one conditional expression unless the information indicated by the third condition of the at least one conditional expression is not present; and when the information indicated by the third condition of the at least one conditional expression is not present, displaying the information indicated by a fourth condition of the at least one conditional expression unless the information indicated by the fourth condition of the at least one conditional expression is not present.

17. The method of claim 16 wherein the information indicated by the first condition of the at least one conditional expression and the information indicated by the second condition of the at least one conditional expression are selected from descriptive text, name information, location information, identifier information and point information.

* * * * *